(12) United States Patent
Tanaka (10) Patent No.: US 10,872,634 B2
(45) Date of Patent: Dec. 22, 2020

(54) METHODS AND DEVICES FOR CONDITIONING DISKS

(71) Applicant: Seagate Technology LLC, Cupertino, CA (US)

(72) Inventor: Samuel Lewis Tanaka, San Leandro, CA (US)

(73) Assignee: Seagate Technology LLC, Fremont, CA (US)

( * ) Notice: Subject to any disclaimer, the term of this patent is extended or adjusted under 35 U.S.C. 154(b) by 596 days.

(21) Appl. No.: 15/499,320

(22) Filed: Apr. 27, 2017

(65) Prior Publication Data

US 2018/0315446 A1 Nov. 1, 2018

(51) Int. Cl.
*G11B 5/84* (2006.01)
*F25D 3/10* (2006.01)

(52) U.S. Cl.
CPC . *G11B 5/84* (2013.01); *F25D 3/10* (2013.01)

(58) Field of Classification Search
None
See application file for complete search history.

(56) References Cited

U.S. PATENT DOCUMENTS

| | | | |
|---|---|---|---|
| 5,181,556 A | 1/1993 | Hughes | |
| 5,287,914 A | 2/1994 | Hughes | |
| 5,857,474 A * | 1/1999 | Sakai | B08B 7/00 134/102.3 |
| 6,408,537 B1 | 6/2002 | Aswad | |
| 6,883,250 B1 * | 4/2005 | Aggarwal | H01L 21/67109 118/728 |
| 7,000,418 B2 | 2/2006 | Rogers et al. | |
| 8,313,579 B2 | 11/2012 | Cruz et al. | |
| 8,524,052 B1 | 9/2013 | Tan et al. | |
| 2007/0095367 A1 * | 5/2007 | Wang | H01L 21/67046 134/33 |
| 2014/0302624 A1 * | 10/2014 | Kim | H01L 21/56 438/26 |
| 2015/0200123 A1 * | 7/2015 | Brugger | H01L 21/68728 219/444.1 |
| 2015/0340251 A1 * | 11/2015 | Wakita | H01L 21/67051 438/748 |
| 2016/0047596 A1 * | 2/2016 | Yi | G11B 5/8404 62/62 |

FOREIGN PATENT DOCUMENTS

JP 2011083837 A * 4/2011

OTHER PUBLICATIONS

English Machine Translation of JP 2011-083837.*

* cited by examiner

*Primary Examiner* — Nicole Blan
(74) *Attorney, Agent, or Firm* — Faegre Drinker Biddle & Reath LLP (57) ABSTRACT

A system includes a cooling plate coupled to a first disk holder and to a second disk holder. The first disk holder and the second disk holder are each shaped to be removably coupled to respective inner diameter surfaces of disks such that, when coupled, each disk is positioned a distance from the cooling plate.

19 Claims, 8 Drawing Sheets

METHODS AND DEVICES FOR CONDITIONING DISKS

SUMMARY

In certain embodiments, a system includes a cooling plate coupled to a first disk holder and to a second disk holder. The first disk holder and the second disk holder are each shaped to be removably coupled to respective inner diameter surfaces of disks such that, when coupled, each disk is positioned a distance from the cooling plate.

In certain embodiments, a method of conditioning disks includes positioning a first disk at a first conditioning position for conditioning the first disk. The method further includes positioning a second disk at a second conditioning position for conditioning the second disk while the first disk is being conditioned. The method further includes removing the first disk from the first conditioning position and positioning a third disk at the first conditioning position while the second disk is being conditioned.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Disk-shaped magnetic recording media for hard disk drives are subjected to a variety of process steps during manufacturing. During manufacturing, various magnetic and non-magnetic films are deposited onto a glass or aluminum substrate which moves to different stations along a manufacturing line. The manufacturing line includes disk conditioning machines that carry out various conditioning processes that clean, heat, and/or cool disks at different stages of manufacture. Certain embodiments of the present disclosure are directed to systems and methods for conditioning disks. Although disk cooling is the exemplary conditioning process described below, the disclosure is applicable to other disk-conditioning processes.

Some disk-cooling processes involve moving a single disk into a chamber and positioning the disk between two cooling plates. Once the disk is positioned and the chamber is prepared, the cooling plates are programmed to move towards the disk and maintain their position for a predetermined period of time to cool the disk. Then, the cooling plates are moved away from the disk and the process is repeated for the next disk.

One concern with the above-described process is that it can be difficult to accurately position and/or verify the position of the cooling plates next to the disk. Another concern is that disks are cooled serially which, in practice, limits the amount of time devoted to cooling each disk. With the above-described process, simply increasing the amount of time devoted to cooling each disk is not a practical option because increased cooling time increases overall manufacturing time and/or because the time allotted to cooling processes is fixed within a manufacturing line. Further, simply adding additional cooling stations undesirably increases the footprint and overall cost of the manufacturing line. Certain embodiments of the present disclosure are accordingly directed to, among other things, approaches that provide increased flexibility in the amount of time spent conditioning disks and/or that provide increased predictability in positioning the disks for conditioning.

Figure 1:
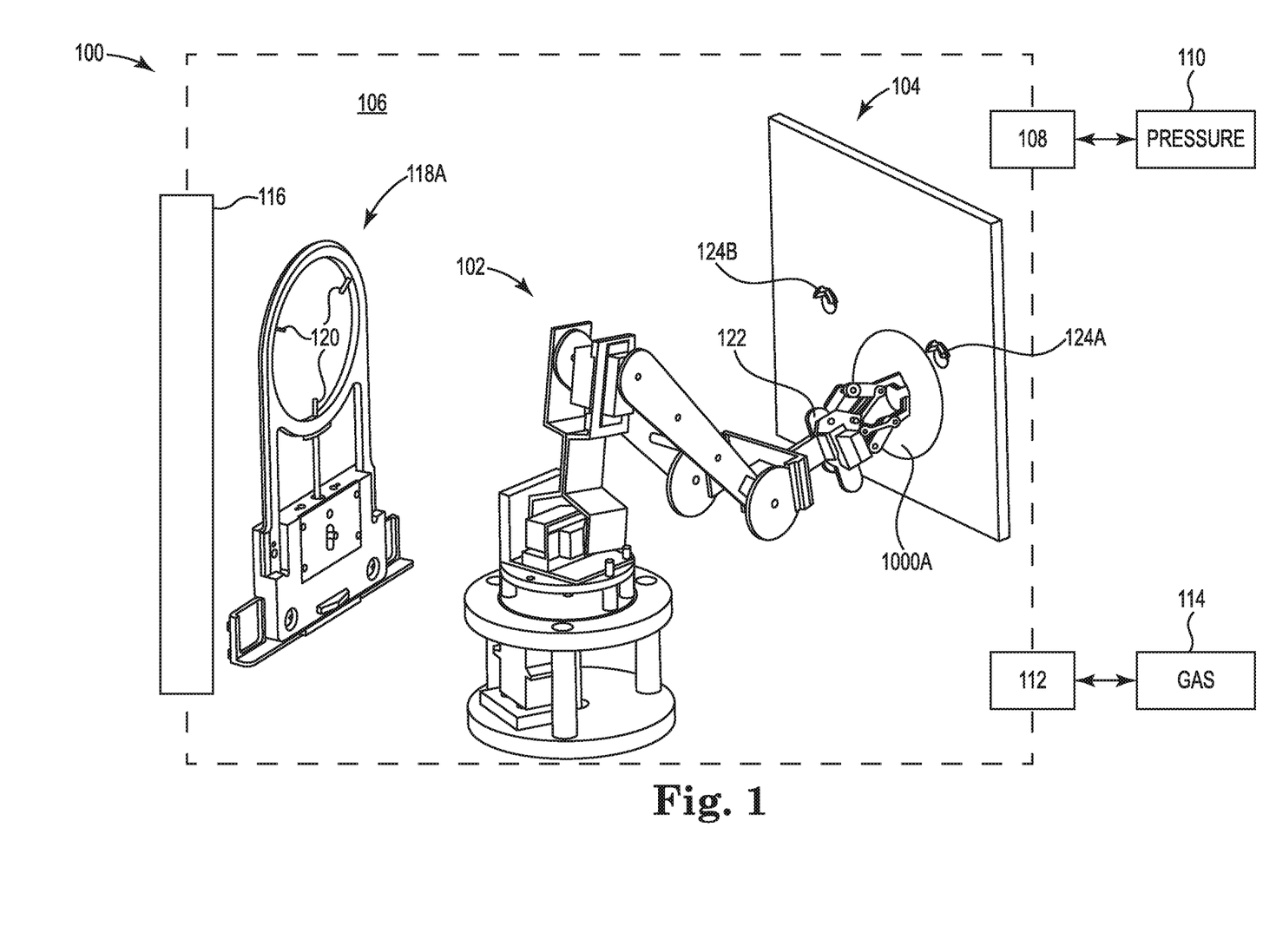
FIG. 1 shows a perspective view of features of a disk conditioning machine, in accordance with certain embodiments of the present disclosure.

FIG. 1 shows a conditioning machine 100 including a robotic arm 102 and a cooling plate 104 (shown in more detail in FIGS. 2A, 2B, and 3) positioned within a chamber 106 formed by the machine 100. The machine 100 includes a pressure exchange mechanism 108, which can be coupled to a pressure source 110, and a gas exchange mechanism 112, which can be coupled to a gas source 114. The pressure exchange mechanism 108 and the gas exchange mechanism 112 can each include one or more valves that facilitate gas and/or pressure exchange between the pressure source 110 and the gas source 114, respectively, and the chamber 106.

The machine 100 also includes a door 116 through which a first disk carrier 118A can enter and exit the chamber 106. The first disk carrier 118A is an apparatus configured to move a disk within a manufacturing line. The first disk carrier 118A shown in FIG. 1 includes a plurality of clips 120 that mechanically couple and release a disk at or near its outer diameter surface from the first disk carrier 118A. Any suitable disk carrier can be used in the context of the present disclosure.

During operation of the machine 100, the door 116 of the machine 100 opens to allow the first disk carrier 118A to enter the chamber 106 with a first disk 1000A. In some embodiments, before entering the chamber, the first disk 1000A may have been subjected to a heat-intensive process such that the first disk 1000A requires cooling for a subsequent process. The robotic arm 102 includes an end effector 122 that is configured to mechanically and releasably couple to an inner diameter surface 1002A (FIG. 2A) of the first disk 1000A. In some embodiments, the end effector 122 is configured to couple to a disk's outer diameter surface. Once the robotic arm 102 couples to the first disk 1000A and removes the first disk 1000A from the first disk carrier 118A, the first disk carrier 118A exits the chamber 106 and the door 116 is closed such that the chamber 106 is sealed. Once the chamber is sealed 106, the gas exchange mechanism 112 functions to allow gas (e.g., hydrogen, helium) to enter the chamber 106 from the gas source 114, and the pressure exchange mechanism 108 functions allow the pressure source 110 to bring the chamber to a desired pressure.

Figure 2A:
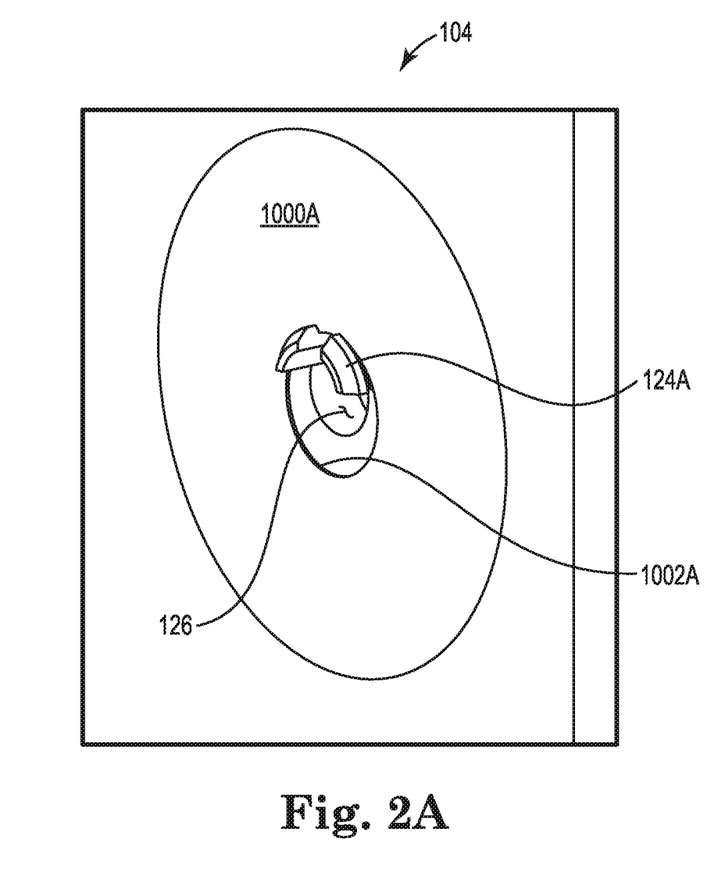
FIG. 2A shows a close-up perspective view of a cooling assembly from the disk conditioning machine of FIG. 1.
Figure 2B:
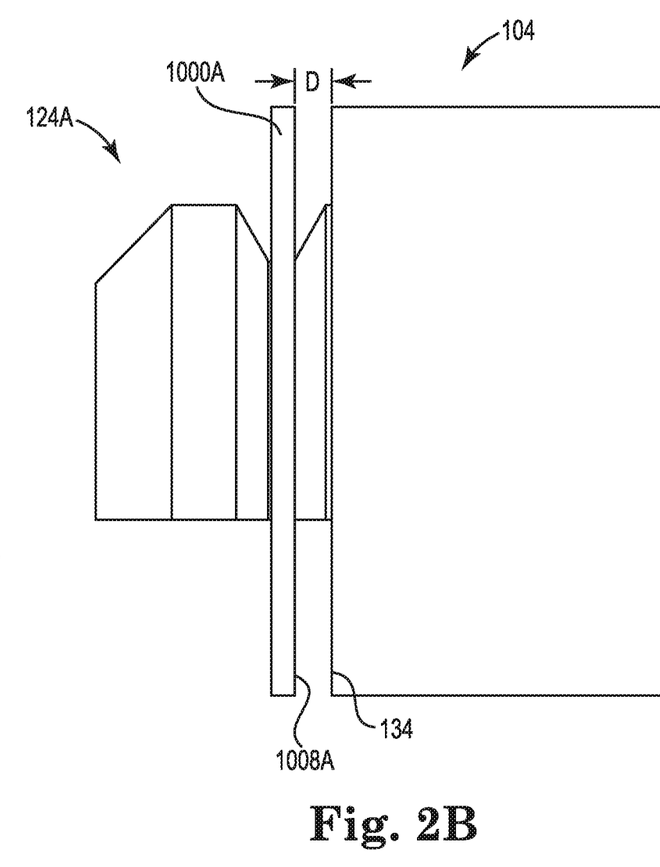
FIG. 2B shows a side view of the first disk and cooling assembly of FIG. 2A.
Figure 3:
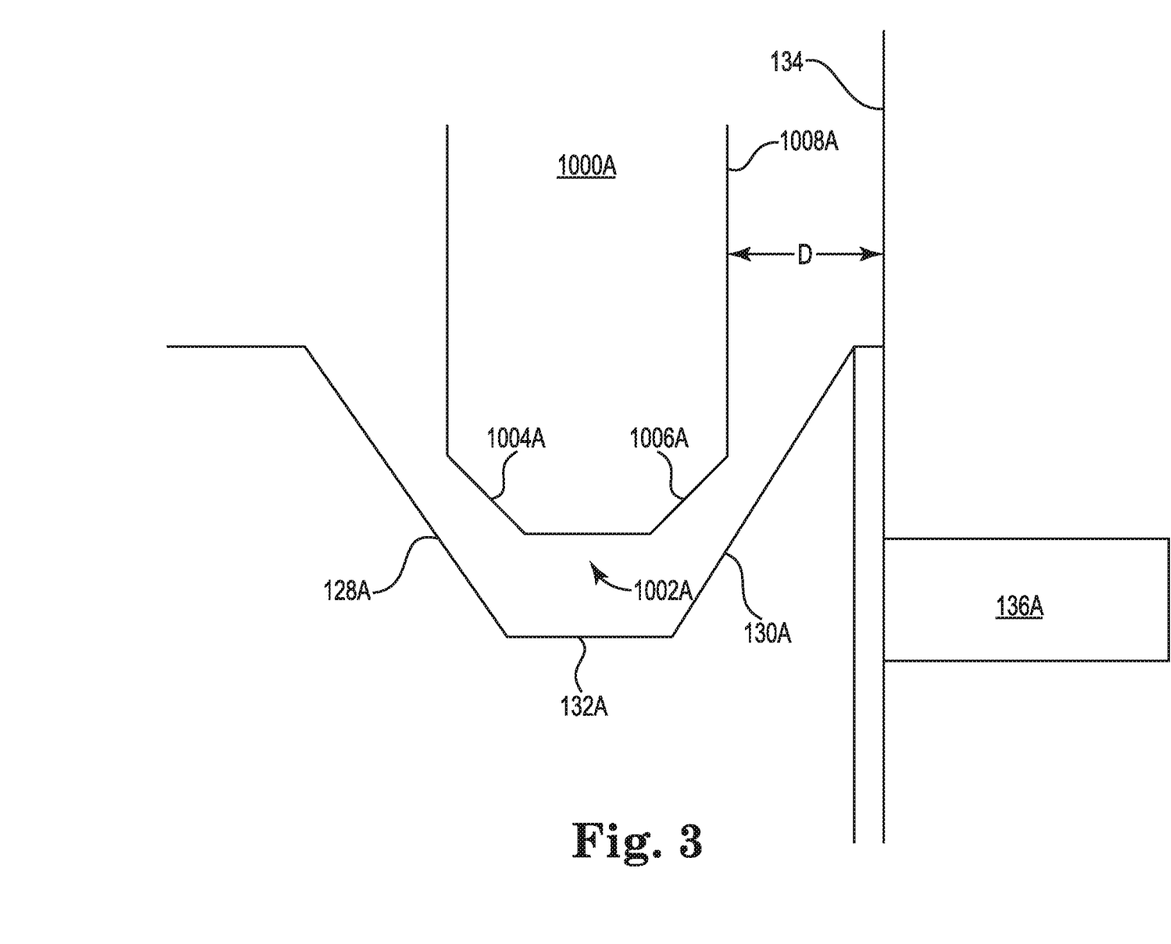
FIG. 3 shows a cross-section view of the first disk and cooling assembly of FIG. 2B.

While the chamber 106 is being prepared, the robotic arm 102 rotates and couples the first disk 1000A to the cooling plate 104 via a one of a plurality of disk holders 124A and 124B, which are coupled to the cooling plate 104. FIGS. 2A, 2B, and 3 show the disk holders 124A and 124B can each be a hanger-like structure that permits disks to rest upon the structure near the cooling plate 104. In some embodiments, the disk holders 124A and 124B can be or include other shapes and/or structures that allow a disk to be coupled and uncoupled, fastened and unfastened, and/or otherwise mounted and unmounted to and from the disk holder 124A and 124B. To position the first disk 1000A adjacent the cooling plate 104, the robotic arm 102 positions its end effector 122 at least partially in an aperture 126 (shown in FIG. 2A) of the cooling plate 104 to allow the inner diameter surface 1002A of the first disk 1000A to surround the first disk holder 124A. The robotic arm 102 then lowers the end effector 122 such that the inner diameter surface 1002A rests on the first disk holder 124A as shown in FIGS. 2A and 2B.

In some embodiments, like the embodiment shown in FIG. 3, the inner diameter surface 1002A of the disk 1000A includes first and second chamfers 1004A and 1006A. The first and second chamfers 1004A and 1006A rest on first and second inclined surfaces 128A and 130A on the first disk holder 124A. This approach reduces the amount of area of the disk 1000A in direct contact with the first disk holder 124A during cooling. As shown in FIG. 3, the first and second inclined surfaces 128A and 130A are angled with respect to a plane parallel to a face 134 of the cooling plate 104. The angles of the first and second inclined surfaces 128A and 130A are different angles than those of the first and second chamfers 1004A and 1006A of the inner diameter surface 1002A, with respect to the face 134. In some embodiments, the angles of the first and second inclined surfaces 128A and 130A are the same as the first and second chamfers 1004A and 1006A. In some embodiments, the inner diameter surface 1002A of the disk 1000A at least partially rests on a flat portion 132A of the first disk holder 124A. In some embodiments, the first and second inclined surfaces 128A and 130A on the first disk holder 124A are shaped (e.g., hemisphere shaped) to further limit the amount of area of the disk 1000A in direct contact with the first disk holder 124A. In some embodiments, the disk 1000A rests on a material positioned between the disk 1000A and the disk holders, 124A and 124B, such that the material provides further protection against undesirable thermal energy transfer and/or damage to the disk 1000A.

Regardless of what portion of the disk 1000A rests on what portion of the disk holders, 124A and 124B, or whether the disk 1000A rests on an intervening material, the disk holders 124A and 124B are configured such that disks rest at a distance, D, from the cooling plate 104. FIG. 2A shows the distance, D, being a distance between the face 134 of the cooling plate 104 and a first side 1008A of the first disk 1000A. In some embodiments, the distance, D, is a predetermined distance of 0.01 inches to 0.03 inches. In some embodiments, the distance, D, is a predetermined distance of 0.005 inches to 0.02 inches. Although shown as being flat in the figures, the face 134 of the cooling plate 104 can be shaped (e.g., curved) and include features other than the first and second disk holders, 124A and 124B.

Configuring the disk holders, 124A and 124B, such that disks tend to rest at the distance, D, helps provide consistent and predictable positioning of the disks. A shorter distance can increase the rate at which the disk is cooled, thus reducing the time required to cool the disk for a given required temperature differential.

FIG. 3 further shows the first disk holder 124A being coupled to the cooling plate 104 by one or more fasteners 136A. The fasteners 136A can be pins or similar fasteners that permit the first disk holder 124A to be uncoupled from cooling plate 104 when the first disk holder 124A needs to be replaced. The first disk holder 124A can comprise materials such as ceramics that thermally isolate the first disk holder 124A from the cooling plate 104. Thermally isolating the first disk holder 124A and the second disk holder 124B from the cooling plate 104 helps avoid disks being subjected to concentrated, local cooling which can lead to deformation of the disks.

The cooling plate 104 acts as a heatsink that cools the disks. Cooling is facilitated by the gas (e.g., hydrogen, helium) in the chamber 106. The cooling plate 104 can comprise materials such as copper that have high thermal conductivity. In some embodiments, the cooling plate 104 is at least partially coated with black body coating (e.g., carbon-nanotube-based coatings) to increase cooling capabilities. The cooling plate 104 can include channels (not shown) that facilitate flow of a cryogenic liquid within the cooling plate 104. The cooling plate 104 can, itself, form part of a wall of the chamber 106.

As previously mentioned, during operation of the machine 100, the robotic arm 102 positions the first disk 1000A on the first disk holder 124A coupled to the cooling plate 104, which cools the first disk 1000A to a desired temperature. For the first disk 1000A to reach the desired temperature, the machine 100 can be programmed to maintain the first disk's position on the first disk holder 124A for a predetermined period of time. The predetermined period of time can be determined based on the desired temperature, the disk's estimated starting temperature, the distance (D), the cooling plate's temperature, the pressure in the chamber 106, among other things. While the first disk 1000A is positioned next to the cooling plate 104 for cooling, the robotic arm 102 (or a separate robotic arm) can work towards positioning a second disk next to the cooling plate 104 on the second disk holder 124B.

Figure 4:
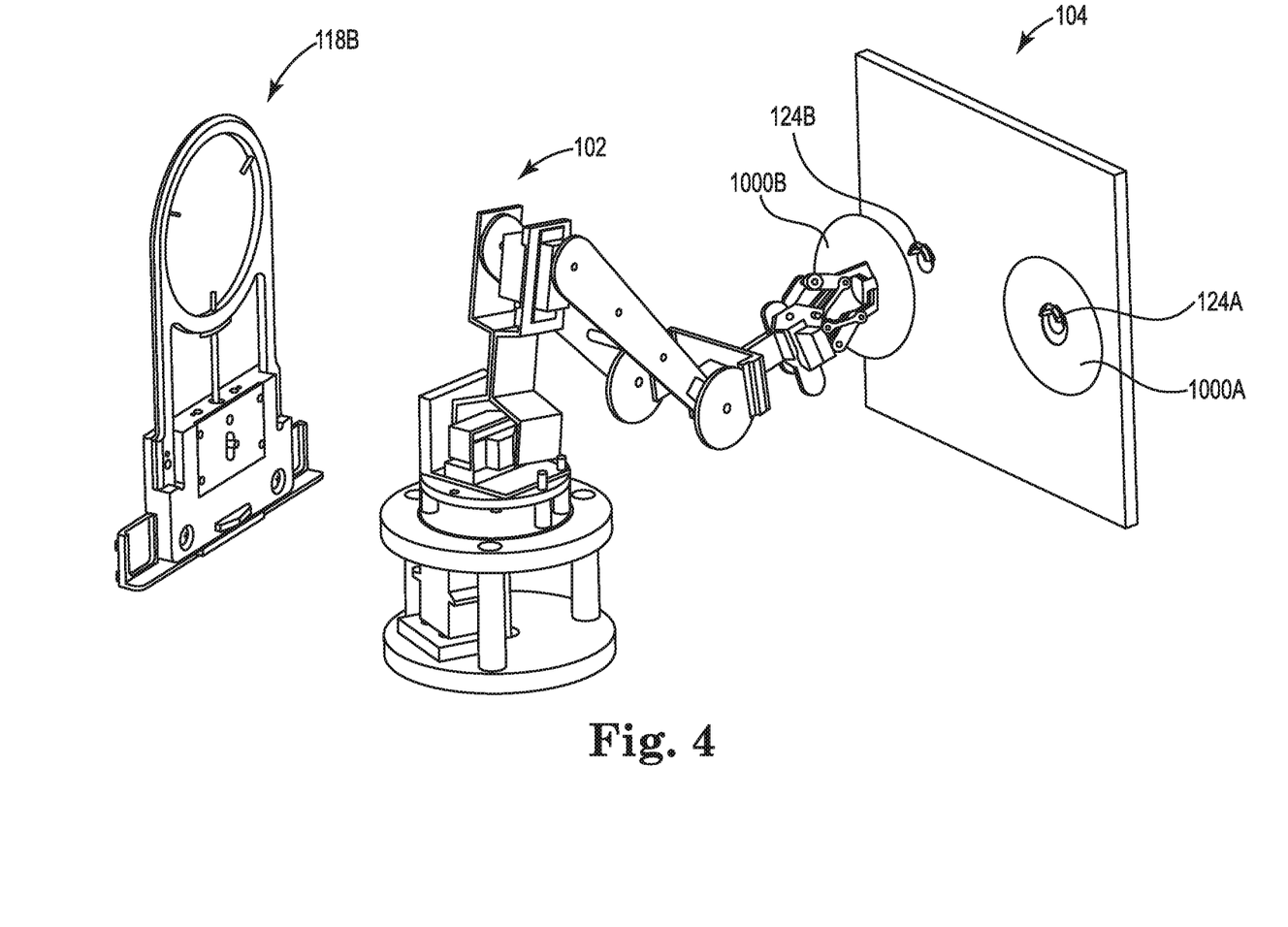
FIGS. 4 and 5 show a perspective view of features of the disk conditioning machine of FIG. 1.

FIG. 4 shows a second disk carrier 1188 configured to enter the chamber 106 with a second disk 1000B. The robotic arm 102 (or a separate robotic arm) can use the end effector 122 to mechanically and releasably couple to an inner diameter surface 1002B of the second disk 1000B. Then, the robotic arm 102 is configured to rotate and couple the second disk 1000B to the cooling plate 104 via the second disk holder 124B in a similar manner as the robotic arm 102 positioned the first disk 1000A on the first disk holder 124A. As shown in FIG. 4, the first disk holder 124A and the second disk holder 124B are spaced from each other such that the first disk 1000A does not contact or otherwise interfere with the second disk 1000B while the disks are resting on or being transferred to and from the first and second disk holders, 124A and 124B.

The above-described steps for handling the second disk 1000B, or at least some of those steps, are carried out while the first disk 1000A is positioned next to the cooling plate 104 and being cooled. As previously mentioned, some disk-cooling processes involve cooling disks one-by-one in serial which, in practice, limits the amount of time able to be devoted to cooling each disk. The above-described approach permits the first disk 1000A to be cooled while (i.e., in parallel) the second disk 1000B is being positioned in the chamber 106. This increases the time the first disk 1000A can be positioned next to the cooling plate 104 and therefore allows for greater flexibility in the time a disk can be cooled. A longer cooling time allows for greater cooling capabilities such as the ability to cool a disk from a higher temperature to a desired temperature. Longer disk-cooling times also allow for the disk to be cooled by a single cooling plate 104 rather than multiple cooling plates—although the description is not limited to single-cooling-plate embodiments. In certain embodiments, when cooling a disk from one side, it can take between three and four seconds for the full disk to cool to a desired temperature throughout its full thickness. Disk-cooling approaches that cool disks serially typically are not given more than two seconds to cool a given disk because the entire process (i.e., loading and/or positioning the disk, preparing the chamber, cooling the disk, and unloading and/or positioning the disk) for such approaches is limited to a total of three seconds per disk in a manufacturing line. As such, with a total allotment of three seconds, the non-cooling processes significantly reduce the amount of time able to be spent actually cooling the disk. In contrast, the above-described approach increases the cooling time available for a given disk.

Figure 5:
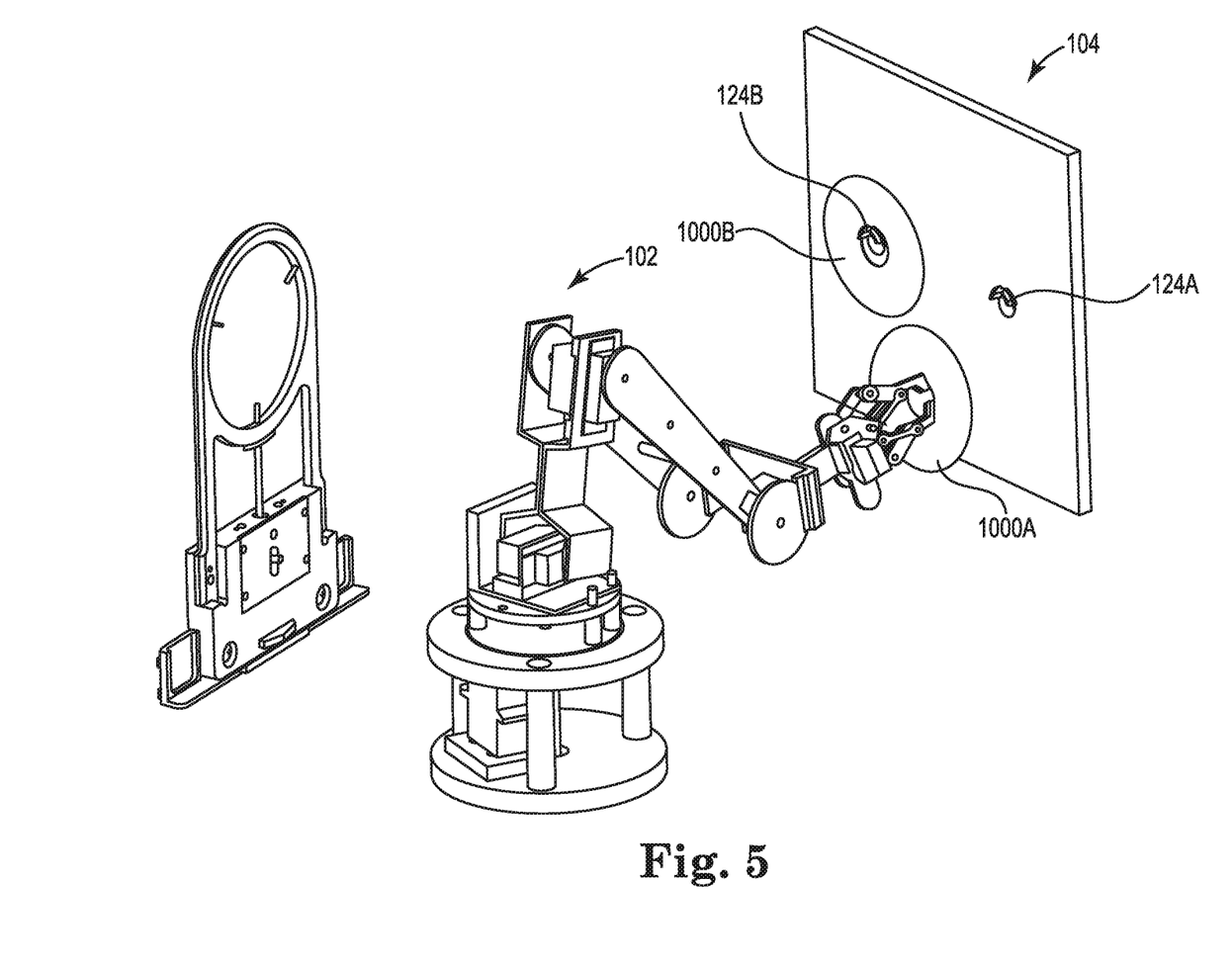

As shown in FIG. 5, once the second disk 1000B is coupled to the second disk holder 124B (or while the second disk 1000B is in the process of being coupled to the second disk holder 124B), the robotic arm 102 (or a separate robotic arm) uncouples the first disk 1000A from the first disk holder 124A. The first disk 1000A is then coupled to a disk carrier and removed from the chamber 106.

Figure 6:
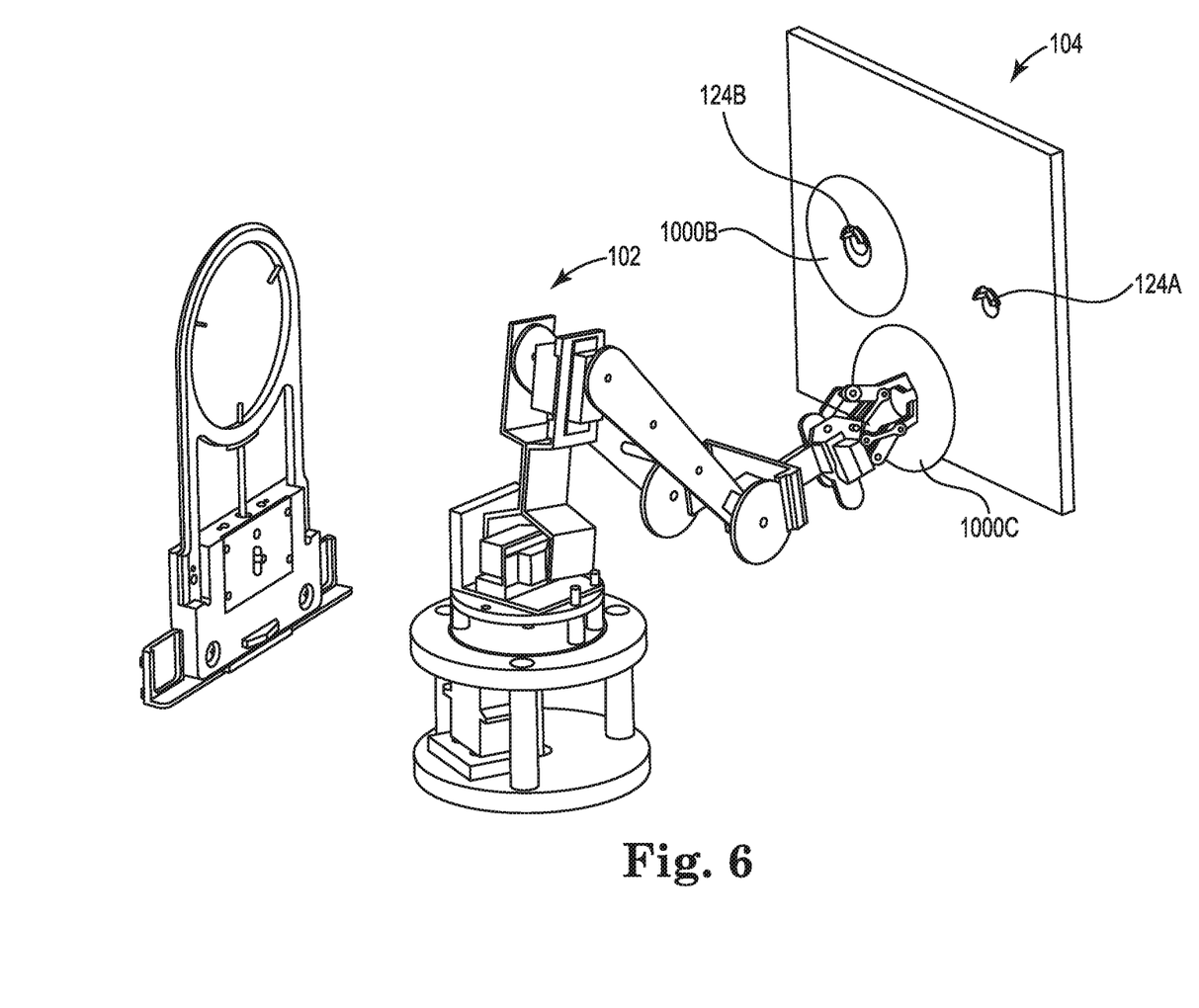
FIG. 6 shows a perspective view of features of the disk conditioning machine of FIG. 1.

A similar process can then be repeated for subsequent disks. As shown in FIG. 6, while the second disk 1000B is positioned next to the cooling plate 104 for cooling, the robotic arm 102 (or a separate robotic arm) can work towards positioning a third disk 1000C next to the cooling plate 104 on the first disk holder 124A.

Figure 7:
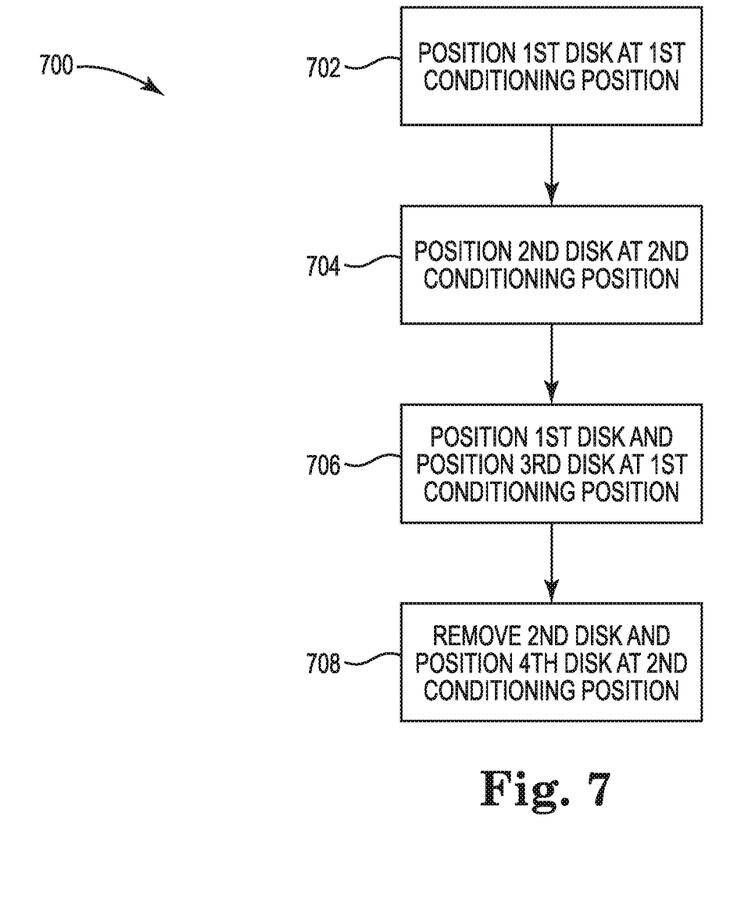
FIG. 7 shows a block representation of steps in a method for conditioning disks, in accordance with certain embodiments of the present disclosure.

As mentioned above, during manufacture disks are subjected to conditioning processes other than cooling, such as cleaning and heating processes. Although disk cooling was the exemplary process described above, similar approaches can be applied to other disk-conditioning processes. FIG. 7 shows a block representation of steps in a method 700 that can be used to increase flexibility for disk-conditioning processes.

The method 700 includes positioning a first disk at a first conditioning position for conditioning the first disk (step 702). The method 700 further includes, positioning a second disk at a second conditioning position for conditioning the second disk while the first disk is being conditioned (step 704). The first and second conditioning positions can include a position, for example, within a bath of a cleaning liquid or adjacent a cleaning device such as a nozzle that is configured to expel a cleaning gas to dispel contaminants. The first and second conditioning positions can also include positions adjacent a cooling device such as the cooling plate 104 of FIG. 1. In some embodiments, the first and second conditioning positions are a distance from the cooling or cleaning devices. In some embodiments, the distance is 0.01 inches to 0.03 inches or 0.005 inches to 0.02 inches.

The method 700 further includes removing the first disk from the first conditioning position and positioning a third disk at the first conditioning position while the second disk is being conditioned (step 706). The method 700 further includes removing the second disk from the second conditioning position and positioning a fourth disk at the second conditioning position while the third disk is being conditioned (step 708).

In some embodiments, the various disks are each positioned by single piece of robotic equipment such as a robotic arm. In some embodiments, the various disks are positioned by different pieces of robotic equipment such as different robotic arms. In some embodiments, the at least one robotic arm uses an end effector to removably couple to each disk. The end effector can couple to an inner diameter surface of each disk rather than an outer diameter. The inner diameter surface and data stored near the inner diameter surface of a disk is less critical to performance of a hard disc drive, and as such, damage to or near the inner diameter surface is less significant. In some embodiments, the at least one robotic arm decouples the first disk from a first disk carrier before positioning the first disk at the first conditioning position. The at least one robotic arm can also decouple the second disk from a second disk carrier before positioning the second disk at the second conditioning position.

Figure 8:
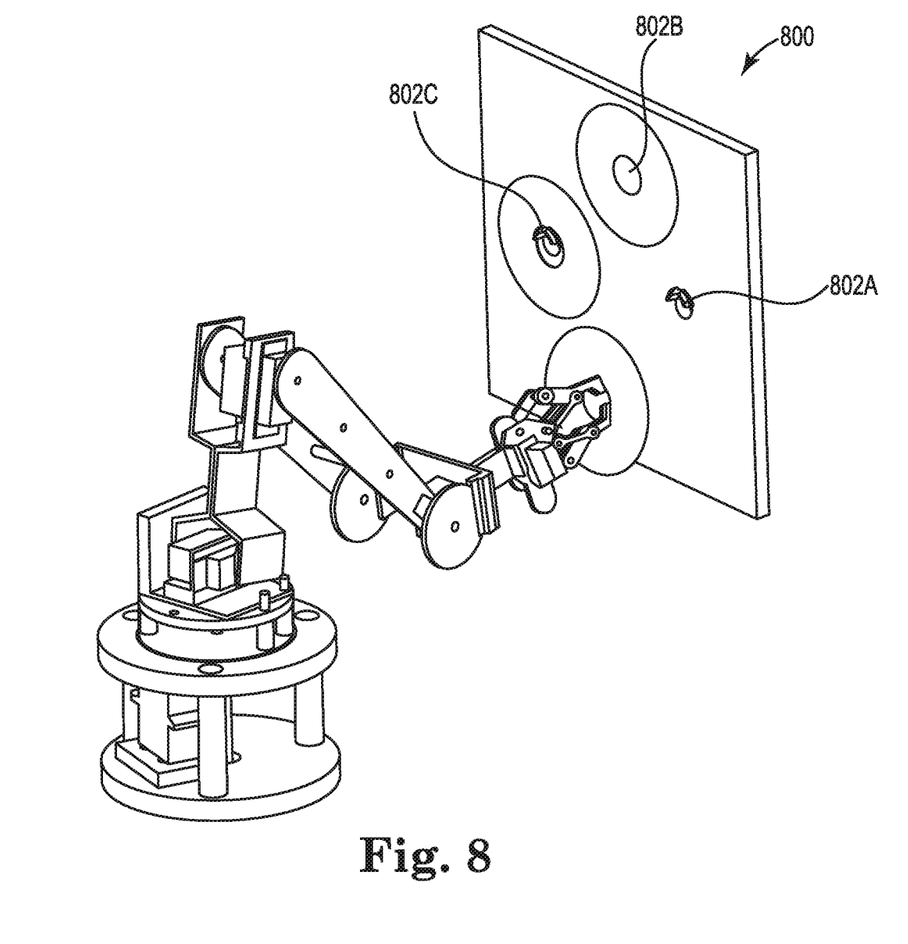
FIG. 8 shows a perspective view of features of a disk conditioning machine, in accordance with certain embodiments of the present disclosure.

Although the above-described figures show the cooling plate 104 having just two disk holders, 124A and 124B, the cooling plate 104 can have more than two disk holders. FIG. 8 shows a cooling plate 800 including a first disk holder 802A, a second disk holder 802B, and a third disk holder 802C. The cooling plate 800 could be incorporated into the machine 100 of FIG. 1. Increasing the number of disk holders can increase the time available for cooling each disk. Increasing the number of disk holders can also increase number of disks cooled in a given period of time. An increased number disk holders may require using additional robotic arms. But, as described above, it is appreciated that multiple robotic arms can be used to couple and uncouple disks to the cooling plate—regardless of the number of disk holders coupled to a cooling plate.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

What is claimed is:

1. A system comprising:
a cooling plate coupled to a first disk holder and to a second disk holder, wherein the first disk holder and the second disk holder are each shaped to be removably coupled to respective inner diameter surfaces of disks such that, when coupled, each disk is positioned a distance from the cooling plate, wherein the first disk holder and the second disk holder each include first and second inclined surfaces that the inner diameter surface of each disk rests on, wherein the first and second inclined surfaces are angled with respect to a plane parallel to a face of the cooling plate.

2. The system of claim 1, wherein the first disk holder and the second disk holder each include a hanger-like structure such that the inner diameter surface of each disk rests on each hanger-like structure.

3. The system of claim 1, wherein the first disk holder is removably coupled to the cooling plate by a first fastener, and wherein the second disk holder is removably coupled to the cooling plate by a second fastener.

4. The system of claim 1, wherein the distance is 0.01 inches to 0.03 inches.

5. The system of claim 1, wherein the cooling plate is cryogenically cooled.

6. The system of claim 1, further comprising:
a disk-conditioning machine forming a chamber, wherein the first disk holder and the second disk holder are positioned within the chamber.

7. The system of claim 6, wherein the cooling plate at least partially forms part of one of a wall of the chamber.

8. The system of claim 6, wherein the disk-conditioning machine includes a first valve configured to facilitate communication between the chamber and a pressure source and a second valve configured to facilitate communication between the chamber and a gas source.

9. The system of claim 1, further comprising:
a disk-conditioning machine including one or more robotic arms, wherein the disk-conditioning machine is configured to:
position a first disk on the first disk holder via the one or more robotic arms,
while the first disk is positioned on the first disk holder, position a second disk on the second disk holder via the one or more robotic arms, and
while the second disk is positioned on the second disk holder, remove the first disk from the first disk holder and position a third disk on the first disk holder via the one or more robotic arms.

10. The system of claim 9, wherein each of the one or more robotic arms include an end effector configured to couple to the inner diameter surface of the first disk and the second disk.

11. The system of claim 1, wherein the first disk holder and the second disk holder each include a flat portion positioned between the first and second inclined surfaces.

12. The system of claim 11, wherein the first disk holder and the second disk holder are shaped such that the inner diameter surface of each disk rests on at least one of the first and second inclined surfaces or the flat portion.

13. A system comprising:
a cooling plate coupled to a first disk holder and to a second disk holder, wherein the first disk holder and the second disk holder protrude directly from the cooling plate, wherein the first disk holder and the second disk holder are each shaped to be removably coupled to respective inner diameter surfaces of disks such that, when coupled, each disk is positioned a fixed distance from the cooling plate, and wherein the first disk holder and the second disk holder each include a hanger-like structure such that the inner diameter surface of each disk rests on each hanger-like structure.

14. The system of claim 13, wherein the first disk holder and the second disk holder each include first and second inclined surfaces opposing each other.

15. The system of claim 13, wherein the first disk holder and the second disk holder protrude directly from a central region of the cooling plate.

16. A system comprising:
a cooling plate coupled to a first disk holder and to a second disk holder, wherein the first disk holder and the second disk holder are each shaped to be removably coupled to respective inner diameter surfaces of disks such that, when coupled, each disk is positioned a fixed distance from the cooling plate;
a disk-conditioning machine including one or more robotic arms with an end effector, wherein the disk-conditioning machine is programmed to:
position a first disk on the first disk holder via the one or more robotic arms,
while the first disk is positioned on the first disk holder, position a second disk on the second disk holder via the one or more robotic arms, and
while the second disk is positioned on the second disk holder, remove the first disk from the first disk holder and position a third disk on the first disk holder via the one or more robotic arms.

17. The system of claim 16, wherein the first disk holder and the second disk holder each include first and second inclined surfaces opposing each other.

18. The system of claim 17, wherein the first disk holder and the second disk holder each include a flat portion positioned between the opposing first and second inclined surfaces.

19. The system of claim 16, wherein the first disk holder is removably coupled to the cooling plate by a first fastener, and wherein the second disk holder is removably coupled to the cooling plate by a second fastener.

* * * * *